(12) United States Patent
El Defrawy et al.

(10) Patent No.: US 10,158,606 B2
(45) Date of Patent: Dec. 18, 2018

(54) FIREWALL FILTER RULES GENERATION

(71) Applicant: THE BOEING COMPANY, Chicago, IL (US)

(72) Inventors: Karim M. El Defrawy, Santa Monica, CA (US); Pape M. Sylla, Calabasas, CA (US)

(73) Assignee: THE BOEING COMPANY, Chicago, IL (US)

(*) Notice: Subject to any disclaimer, the term of this patent is extended or adjusted under 35 U.S.C. 154(b) by 22 days.

(21) Appl. No.: 15/238,661

(22) Filed: Aug. 16, 2016

(65) Prior Publication Data
US 2018/0054418 A1 Feb. 22, 2018

(51) Int. Cl.
G06F 21/30 (2013.01)
H04L 29/06 (2006.01)

(52) U.S. Cl.
CPC ...... *H04L 63/0263* (2013.01); *H04L 63/0236* (2013.01); *H04L 63/0245* (2013.01); *H04L 63/10* (2013.01)

(58) Field of Classification Search
CPC ................................ H04L 63/02; H04L 63/10
USPC ................................................ 726/11, 12, 13
See application file for complete search history.

(56) References Cited

U.S. PATENT DOCUMENTS

| 2002/0083331 A1 | 6/2002 | Krumel |
| 2005/0076121 A1 | 4/2005 | Kortum et al. |
| 2005/0268335 A1 | 12/2005 | Le et al. |
| 2011/0218701 A1 | 9/2011 | Ric et al. |
| 2013/0210387 A1* | 8/2013 | Lynch ............. H04W 12/06 455/411 |
| 2014/0068698 A1 | 3/2014 | Burchfield et al. |
| 2016/0156591 A1 | 6/2016 | Zhou et al. |
| 2016/0232484 A1 | 8/2016 | Skaaksrud |

FOREIGN PATENT DOCUMENTS

WO   2006105093 A2   10/2006

OTHER PUBLICATIONS

El Defrawy, K., et al., "Optimal Allocation of Filters against DDoS Attacks," Information Theory and Applications Workshop, Jan. 29-Feb. 2, 2007, IEEE, Piscataway, NJ, 10 pp.
Soldo, F., et al., "Filtering Sources of Unwanted Traffic," Information Theory and Applications Workshop, Jan. 2008, IEEE, Piscataway, NJ, 10 pp.
Soldo, F., et al., Optimal Filtering of Source Address Prefixes: Models and Algorithms, IEEE Conference on Computer Communications (INFOCOM), Apr. 19-25, 2009, IEEE, Piscataway, NJ, 9 pp.

(Continued)

Primary Examiner — Izunna Okeke
(74) Attorney, Agent, or Firm — Toler Law Group, P.C.

(57) ABSTRACT

A method includes obtaining, at a device, packet data descriptive of authorized traffic of a network. The method also includes generating, at the device, rule elements based on the packet data. The method further includes consolidating, at the device, the rule elements based on distance measures associated with the rule elements. The method also includes generating, at the device, firewall filter rules for the network based on the consolidated rule elements.

20 Claims, 9 Drawing Sheets

(56) References Cited

OTHER PUBLICATIONS

Pozo, S., et al., "MDA-Based Framework for Automatic Generation of Consistent Firewall ACLs with NAT," Proceedings of the International Conference on Computational Science and Its Applications,: Part II, Jun. 2009, Springer-Verlag, Berlin, Heidelberg, pp. 130-144.
"Internet Protocol," Wikipedia, <https://en.wikipedia.org/wiki/Internet_Protocol> retrieved Jul. 30, 2018, 5 pgs.
"IPv4," Wikipedia, <https://en.wikipedia.org/wiki/IPv4> retrieved Jul. 30, 2018, 7 pgs.
"IPv6," Wikipedia, <https://en.wikipedia.org/wiki/IPv6> retrieved Jul. 30, 2018, 17 pgs.
"Transmission Control Protocol," Wikipedia, <https://en.wikipedia.org/wiki/Transmission_Control_Protocol> retrieved Jul. 30, 2018, 11 pgs.
"User Datagram Protocol," Wikipedia, <https://en.wikipedia.org/wiki/User_Datagram_Protocol> retrieved Jul. 30, 2018, 4 pgs.
European Search Report dated Dec. 15, 2017 for application No. 17182608.4, 16 pgs.
Extended European Search Report dated Apr. 26, 2018 for application No. 17182608.4, 16 pgs.
Kim, Hyeonwoo et al. "Efficient Method for Inferring a Firewall Policy," Network Operations and Management Symposium, Sep. 21, 2011, 8 pgs.

\* cited by examiner

200

Packet Data 170

| Packet | Source Address | Source Port | Destination Address | Destination Port | Protocol |
|---|---|---|---|---|---|
| 120 | 238 (of 110) | 232 | 230 (of 107) | 236 | 254 |
| 122 | 266 (of 105) | 234 | 248 (of 111) | 242 | 256 |
| 124 | 248 (of 111) | 244 | 266 (of 105) | 246 | 258 |
| 126 | 252 (of 112) | 250 | 266 (of 105) | 262 | 260 |
| 128 | 238 (of 110) | 264 | 240 (of 114) | 265 | 269 |

Rule Elements (REs) 267

| RE | First Addr. Range | First Port | Second Addr. Range | Second Port | Direction | Protocol | Priority |
|---|---|---|---|---|---|---|---|
| 202 | 238 (of 110) | 232 | 230 (of 107) | 236 | → | 254 | 1 |
| 204 | 266 (of 105) | 234 | 248 (of 111) | 242 | → | 256 | 1 |
| 206 | 248 (of 111) | 244 | 266 (of 105) | 246 | → | 258 | 1 |
| 208 | 252 (of 112) | 250 | 266 (of 105) | 262 | → | 260 | 1 |
| 209 | 238 (of 110) | 264 | 240 (of 114) | 265 | → | 269 | 1 |

REs 268

| RE | First Addr. Range | First Port | Second Addr. Range | Second Port | Direction | Protocol | Priority |
|---|---|---|---|---|---|---|---|
| 202 | 238 (of 110) | 232 | 230 (of 107) | 236 | → | 254 | 1 |
| 210 | 266 (of 105) | ANY | 248 (of 111) | ANY | ↔ | 256; 258 | 2 |
| 208 | 252 (of 112) | 250 | 266 (of 105) | 262 | → | 260 | 1 |
| 209 | 238 (of 110) | 264 | 240 (of 114) | 265 | → | 269 | 1 |

REs 270

| RE | First Addr. Range | First Port | Second Addr. Range | Second Port | Direction | Protocol | Priority |
|---|---|---|---|---|---|---|---|
| 202 | 238 (of 110) | 232 | 230 (of 107) | 236 | → | 254 | 1 |
| 212 | 266 (of 105) | ANY | 248 (of 111) ↔ 252 (of 112) | ANY | ↔ | 256; 258; 260 | 3 |
| 209 | 238 (of 110) | 264 | 240 (of 114) | 265 | → | 269 | 1 |

REs 272

| RE | First Addr. Range | First Port | Second Addr. Range | Second Port | Direction | Protocol | Priority |
|---|---|---|---|---|---|---|---|
| 214 | 238 (of 110) | ANY | 230 (of 107) ↔ 240 (of 114) | ANY | → | 254, 269 | 2 |
| 212 | 266 (of 105) | ANY | 248 (of 111) ↔ 252 (of 112) | ANY | ↔ | 256; 258; 260 | 3 |

FIG. 2

Firewall Filter Rules 172

| FFR | First Address Range | First Port | Second Address Range | Second Port | Direction | Protocol | Priority |
|---|---|---|---|---|---|---|---|
| 402 | 238 (of 110) | ANY | 230 (of 107) ↔ 240 (of 114) | ANY | → | 254, 269 | 2 |
| 404 | 266 (of 105) | ANY | 248 (of 111) ↔ 252 (of 112) | ANY | ↔ | 256; 258; 260 | 3 |

| Packet | Source Address | Source Port | Destination Address | Destination Port | Protocol | Decision |
|---|---|---|---|---|---|---|
| 320 | 238 (of 110) | 232 | 230 (of 107) | 236 | 254 | Pass |
| 322 | 266 (of 105) | 234 | 248 (of 111) | 242 | 256 | Pass |
| 324 | 248 (of 111) | 244 | 230 (of 107) | 236 | 254 | Reject |
| 326 | 251 (of 312) | 450 | 266 (of 105) | 262 | 260 | Pass |
| 328 | 266 (of 105) | 234 | 240 (of 114) | 262 | 269 | Reject |
| 330 | 251 (of 312) | 450 | 240 (of 114) | 262 | 269 | Reject |

802

Detect, at a communication controller, a first operation mode of an aircraft

804

In response to detecting the first operation mode, select a first set of firewall filter rules at the communication controller to apply to a network of the aircraft

806

Detect, at the communication controller, a second operation mode of the aircraft that differs from the first operation mode

808

In response to detecting the second operation mode, select a second set of firewall filter rules at the communication controller to apply to the network

FIG. 8

FIREWALL FILTER RULES GENERATION

FIELD OF THE DISCLOSURE

The present disclosure relates to generation of firewall filter rules.

BACKGROUND

A firewall is a network security system that monitors and controls incoming and outgoing network traffic. The firewall may be implemented as a packet filter that operates based on rules indicating properties of packets that are to be allowed and/or denied. A packet may be forwarded or dropped based on the rules. For example, in a "whitelist" embodiment, a packet that satisfies at least one of the rules may be forwarded, whereas a packet that does not satisfy any of the rules may be dropped. Alternatively, in a "blacklist" embodiment, a packet that satisfies at least one of the rules may be dropped, whereas a packet that does not satisfy any of the rules may be forwarded. The filtering rules may be specified by a person (e.g., a network administrator). However, manually determining filtering rules that cover all packets that may potentially be generated in a network may be impractical, time-consuming, or both. Moreover, having a large number of filtering rules may increase delay in packet routing (e.g., because, in some examples, each of the filtering rules may be applied to a packet before a forward/drop decision can be made regarding the packet).

SUMMARY

In a particular aspect, a method includes obtaining, at a device, packet data descriptive of authorized traffic of a network (e.g., a network within an airplane). The method also includes generating, at the device, rule elements based on the packet data. The method further includes consolidating, at the device, at least some of the rule elements based on distance measures (e.g., numerical distances between internet protocol (IP) addresses, media access control (MAC) addresses, etc.) associated with the rule elements. The method also includes generating, at the device, firewall filter rules for the network based on the consolidated rule elements.

In another aspect, a device includes a memory and a processor. The memory is configured to store packet data descriptive of authorized traffic of a network. The processor is configured to generate rule elements based on the packet data. The processor is also configured to consolidate at least some of the rule elements based on distance measures associated with the rule elements. The processor is further configured to generate firewall filter rules for the network based on the consolidated rule elements.

In another aspect, a computer-readable storage device stores instructions that, when executed by a processor, cause the processor to perform operations including detecting a first operation mode of an aircraft. The operations also include, in response to detecting the first operation mode, selecting a first set of firewall filter rules to apply to a network of the aircraft. The operations further include detecting a second operation mode of the aircraft. The operations also include, in response to detecting the second operation mode, selecting a second set of firewall filter rules to apply to the network.

The features, functions, and advantages described herein can be achieved independently in various embodiments or may be combined in yet other embodiments, further details of which are disclosed with reference to the following description and drawings.

BRIEF DESCRIPTION OF THE DRAWINGS

FIG. 2 is a diagram that illustrates an example of generation of rule elements that may be used to generate firewall filter rules;

FIG. 4 is a diagram that illustrates an example of filtering packets based on firewall filter rules;

FIG. 8 is a flow chart of an example of a method of using firewall filter rules.

DETAILED DESCRIPTION

Figure 1:
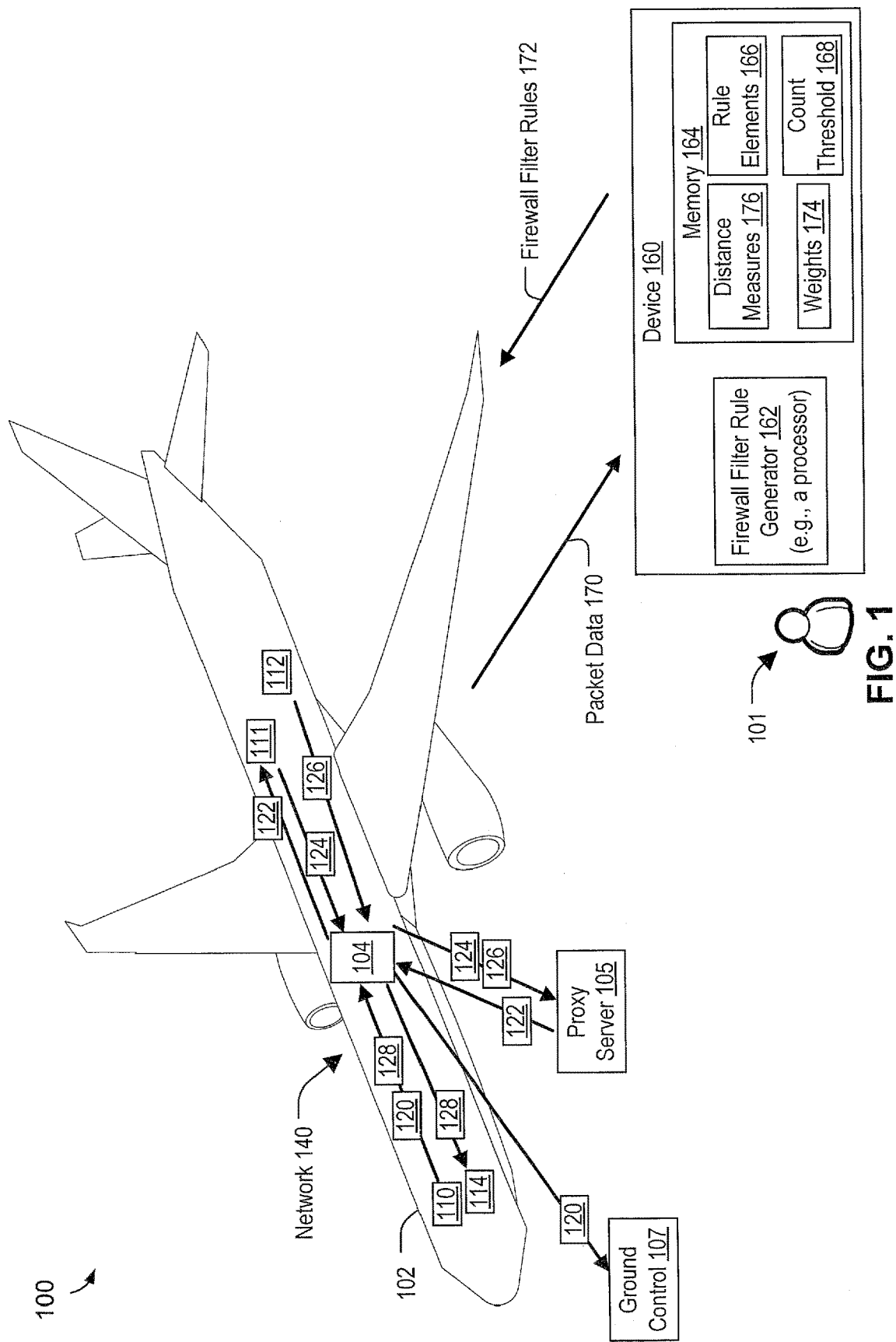
FIG. 1 is a block diagram that illustrates an example of a system that includes a device operable to generate firewall filter rules.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The present disclosure relates to a firewall filter rule generator that automatically generates firewall filter rules based on packet data descriptive of authorized traffic of a network. The packet data may correspond to authorized traffic that is or that is predicted to be generated in the network. In a particular example, the packet data may be generated based on a network emulation. Emulating a network may include generating authorized and/or unauthorized traffic that is expected to flow into, out of, and/or within the network in various contexts. In a particular example, the network may be implemented or planned for deployment in an aircraft. Emulation of the network may generate expected traffic between one or more entertainment devices of the aircraft (and/or passenger devices within the aircraft) and a proxy server external to the network. To illustrate, a passenger may be expected to use an entertainment device to send a request to access a news website via the internet. The request may be sent to the proxy server. The proxy server may forward the request to the news website, and the proxy server may forward data received from the news website to the entertainment device. Thus, in this example, the emulated packet data may correspond to communication between the entertainment device and the proxy server. For packets from the entertainment device to the proxy server, the packet data indicates an address of the entertainment device as a source address and an address of the proxy server as a destination address. For packets from the proxy server to the entertainment device, the packet data indicates an address of the proxy server as a source address and an address of the entertainment device as a destination address.

The firewall filter rule generator may generate rule elements based on the packet data corresponding to the emulated network traffic. For example, the firewall filter rule generator may generate a first rule element indicating that traffic from the address of the entertainment device to the address of the proxy server is authorized and may generate a second rule element indicating that traffic from the address of the proxy server to the address of the entertainment device is authorized.

In some examples, the firewall filter rule generator may reduce a count of the rule elements to satisfy a count threshold (e.g., a maximum rule count) by consolidating the rule elements. For example, the firewall filter rule generator may, in response to determining that a count of the rule elements is greater than the count threshold, generate a consolidated rule element by consolidating the first rule element and the second rule element. The consolidated rule element may indicate that bidirectional traffic between the first address and the second address is authorized. In this case, the unidirectional first rule element and the unidirectional second rule element are replaced with the single consolidated bidirectional rule element, thereby reducing the count of the rule elements.

As another example, the firewall filter rule generator may generate a consolidated rule element by consolidating rule elements that reference single addresses (or a small range of addresses), so that the consolidated rule element refers to a range of addresses (or to a larger range of addresses).

The firewall filter rule generator may generate firewall filter rules based on the consolidated rule elements. For example, the firewall filter rules may correspond to a configuration file. As an example, a particular consolidated firewall filter rule may indicate that traffic is authorized between the entertainment device and the proxy server.

The firewall filter rules, which as described above can be determined based on network emulation and rule consolidation, may be used to filter packets during actual network operation. For example, a communication controller (e.g., a server or a router) of the network may forward a packet to a destination address in response to determining that a source address and the destination address of the packet match at least one of the firewall filter rules. Alternatively, the communication controller may drop a packet in response to determining that a source address, a destination address, or both of the packet do not match any of the firewall filter rules. The present disclosure may thus enable automatic generation of firewall filter rules based on emulated network traffic while consolidating rules to keep a total number of the firewall filter rules less than a threshold.

Generating the firewall filter rules based on the emulated network traffic (as opposed to traffic observed during actual network operation) may enable the firewall filter rules to be generated automatically, relatively quickly, and covering cases that occur infrequently during actual network operation. Further, because network emulation is used, the firewall filter rules may be generated in an "offline" scenario, which may be simpler than monitoring actual network operation in an aircraft while an aircraft operates in various operation modes (e.g., parked, taxiing, ascending, cruising, descending, landing, etc.). Consolidation of firewall filter rules may also reduce and amount of memory used to store the firewall filter rules. Additionally, generating the firewall filter rules based on the emulated network traffic may ensure that the firewall filter rules are based on authorized traffic, and not based on unauthorized traffic of the actual network that has escaped identification as unauthorized traffic. Further, by consolidating firewall filter rules, fewer rules may be analyzed during routing operation, which may reduce an overall delay associated with packet routing.

In some examples, multiple sets of firewall filter rules may be generated based on contextual information. In an example where the network is implemented in an aircraft, the contextual information may include at least one of a type, a model, or an operation mode of the aircraft. To illustrate, a first set of firewall filter rules may be generated based on first packet data that is descriptive of authorized traffic of the network during a first operation mode (e.g., a taxi mode) of the aircraft. For example, the first set of firewall filter rules may indicate that packets corresponding to video-streaming are not authorized to be exchanged with entertainment devices of the network while the aircraft is taxiing to or from an airport gate. A second set of firewall filter rules may be generated based on second packet data that is descriptive of authorized traffic of the network during a second operation mode (e.g., a cruise mode) of the aircraft. For example, the second set of firewall filter rules may indicate that packets corresponding to video-streaming are authorized to be exchanged with the entertainment devices of the network while the aircraft is at cruising altitude. A controller (e.g., processor) of the aircraft may dynamically determine which set of firewall filter rules is to be applied to network traffic, for example based on detecting a "current" operation mode of the aircraft. For example, each set of firewall filter rules may be stored in its own configuration file, and the controller may load a different configuration file when the operation mode of the aircraft changes.

FIG. 1 illustrates an example of a system 100 that includes a device 160 and an aircraft 102. The device 160 (e.g., a computing device that includes a processor) may be located at an airport, a control tower, a test facility, a maintenance facility, a vehicle, an aircraft, an office, or a combination thereof. In an alternative implementation, the aircraft 102 may include the device 160. The device 160 may be configured to generate firewall filter rules 172 based on packet data 170 descriptive of authorized traffic of a network 140, as further described herein.

In the example illustrated in FIG. 1, the network 140 is implemented in the aircraft 102. It should be understood that the network 140 may be implemented in a vehicle that includes or corresponds to an aircraft, an airship, a high attitude balloon, a watercraft, a land craft, or another vehicle, as illustrative, non-limiting examples. The network 140 may include a wired network, a wireless network, or both. The vehicle may include one or more devices configured to communicate via the network 140 with each other, with one or more devices external to the network 140, or a combination thereof. The vehicle may be manned or unmanned (e.g., a drone or an unmanned aerial vehicle (UAV)). In some implementations, the vehicle is an aircraft that includes a fuselage and wings, as shown in FIG. 1. The vehicle may be configured to operate at high altitudes, such as in the stratosphere of the Earth's atmosphere. In some implementations, the vehicle may operate in a particular portion of the stratosphere, such as between 17 kilometers (km) to 22 km above sea level. The vehicle (e.g., the aircraft 102) may be configured to transmit and receive signals corresponding to wireless communications. For example, the vehicle may be part of a wireless communication system.

The packet data 170 may be descriptive of traffic generated in the network 140. In some examples, the packet data 170 indicates traffic generated during operation of the aircraft 102. To illustrate, a packet tracing application may generate data descriptive of packet headers of packets generated in the network 140. A person (e.g., a network administrator) may identify one or more of the packet headers as corresponding to authorized traffic, and the packet data 170 may be descriptive of the authorized traffic. For example, the packet data 170 may be descriptive of the one or more identified packet headers. Alternatively, or in addition, the packet data 170 may be descriptive of traffic generated in an emulation of the network 140. Emulating the network 140 may include generating authorized and/or unauthorized traffic that is expected to flow into, out of, and/or within the network 140 in various contexts (e.g., various operation modes of the aircraft, such as a parked mode, a taxiing mode, a cruising mode, etc.). For example, the network emulation may generate expected traffic between one or more devices of the network 140, expected traffic between one or more devices of the network 140 and one or more devices external to the network 140, or a combination thereof. In such examples, the packet data 170 may be descriptive of the traffic generated in the emulated network.

Some devices (e.g., a navigation device) of the aircraft 102 may be configured to perform operations critical to the functioning (e.g., navigation) of the aircraft 102. Other devices (e.g., an entertainment device) may be configured to perform non-critical operations. The packet data 170 may indicate traffic among a first set of devices (e.g., non-critical devices) and/or a second set of devices (e.g., critical devices). For example, the packet data 170 may indicate a packet with a source address of a first entertainment device of the aircraft 102 and a destination address of a second entertainment device of the aircraft 102. As another example, the packet data 170 may indicate a packet with a source address of a sensor of the aircraft 102 and a destination address of a cockpit display of the aircraft 102. Source and destination addresses may be IP addresses (e.g., IPv4 or IPv6 addresses), MAC addresses, or another type of address.

The device 160 includes a firewall filter rule generator 162 coupled to a memory 164. The firewall filter rule generator 162 may correspond to hardware (e.g., a processor) and/or software (e.g., executable instructions). The memory 164 may include a volatile memory, a non-volatile memory, or a combination thereof. The memory 164 is configured to store data. For example, the memory 164 may store the packet data 170, the firewall filter rules 172, a count threshold 168, one or more weights 174, one or more distance measures 176, one or more rule elements 166, or a combination thereof.

The firewall filter rule generator 162 may automatically generate the firewall filter rules 172 based on authorized traffic of the network 140, where such authorized traffic is indicated by the packet data 170. For example, the firewall filter rule generator 162 may generate a first firewall filter rule indicating that traffic is authorized from a first address to a second address in response to determining that the packet data 170 indicates that a source address of an authorized packet is the first address and a destination address of the packet is the second address.

The firewall filter rules 172 may be based on traffic generated in the network 140 or in an emulation of the network 140. The firewall filter rules 172 automatically generated by the firewall filter rule generator 162 may be more representative of authorized traffic of the network 140 than firewall filter rules generated by a person (e.g., a network administrator). For example, the network administrator may not (e.g., forget to) include some types of authorized traffic in the manually generated firewall filter rules, including but limited to traffic that is present in the network 140 infrequently. Using the firewall filter rule generator 162 to automatically generate the firewall filter rules 172 may make the network administrator available to perform other functions, and may mitigate the chances of human error during rule generation.

The network 140 may include a communication controller 104 coupled to one or more communication devices. For example, the communication controller 104 may be coupled to one or more entertainment devices, such as an entertainment device 111, an entertainment device 112, or both. An entertainment device may be used for communication that is not associated with operation of the aircraft 102. For example, the entertainment device may be used by a passenger or a crew member of the aircraft 102 to exchange e-mails, play games, browse the internet, download movies, use social media, look up directions, etc.

The communication controller 104 may also be coupled to one or more operational units, such as an operational unit 110, an operational unit 114, or both. An operational unit may be used for communication that is associated with operation of the aircraft 102. For example, an operational unit may be used to provide aircraft status (e.g., location, altitude, direction, etc.), provide an aircraft component status, receive flight path data, control a propulsion system, control an avionics system, communicate with ground crew, receive control signals from a human operator, generate sensor data, etc. Operational units may also be configured to communicate with one or more other operational units.

The communication controller 104 may be configured to route packets of the network 140. For example, the communication controller 104 may route packets within the network 140, receive and route a packet from outside the network 140 that is addressed to a device of the network 140, receive and route a packet from a device of the network 140 that is addressed to a device external to the network 140, or a combination thereof. Devices external to the network 140 may include, but are not limited to, a proxy server 105, a ground control device 107, one or more additional devices, or a combination thereof. The proxy server 105 may be used to route traffic to/from the entertainment devices 111, 112 of the network 140. For example, the proxy server 105 may correspond to a gateway or an interface to the internet. In a particular aspect, traffic to/from the entertainment devices 111, 112 may be routed via one or more proxy servers, such as the proxy server 105. The ground control device 107 may be used to route traffic to/from the operational units 110, 114 of the network 140. For example, the ground control device 107 may correspond to a gateway or an interface to a secure network. In a particular aspect, traffic to/from the operational units 110, 114 of the network 140 may be routed via one or more ground control devices, such as the ground control device 107.

During operation, the firewall filter rule generator 162 may obtain the packet data 170 descriptive of authorized traffic of the network 140. For example, the authorized traffic may include a packet 120 from the operational unit 110 to the ground control device 107, a packet 122 from the proxy server 105 to the entertainment device 111, a packet 124 from the entertainment device 111 to the proxy server 105, a packet 126 from the entertainment device 112 to the proxy server 105, a packet 128 from the operational unit 110 to the operational unit 114, or a combination thereof. The packet data 170 may indicate that a source address field of a packet header of the packet 120 indicates a network address of the operational unit 110 (e.g., address "O1"), a source port field of the packet header indicates a port of the operational unit 110 (e.g., port "P1"), a destination address field of the packet header indicates a network address of the ground control device 107 (e.g., address "G"), a destination port field of the packet header indicates a port of the ground control device 107 (e.g., port "P2"), a protocol field of the packet header indicates a particular communication protocol (e.g., network protocol "NP"), or a combination thereof. The packet data 170 may similarly indicate packet header information of each of the packets 122, 124, 126, 128.

The firewall filter rule generator 162 may generate the firewall filter rules 172 based on the packet data 170, as further described with reference to FIG. 2. For example, the firewall filter rule generator 162 may generate the rule elements 166 based on the packet data 170. The rule elements 166 may indicate ranges of authorized values of packet headers. For example, a first rule element may indicate that packets from the source address and the source port associated with the operational unit 110 to the destination address and the destination port associated with the ground control device 107 represented in the particular communication protocol are authorized. The first rule element may thus correspond to the following conditional statement:

if ((source address==O1) AND (source port==P1) AND (destination address==G) AND (destination port==P2) AND (protocol==NP))

The firewall filter rule generator 162 may similarly generate additional rule elements based on each of the packets 122, 124, 126, 128. In some examples, the firewall filter rule generator may operate to keep a total number of the rule elements 166 less than the count threshold 168. For example, in response to determining that a count of the rule elements 166 fails to satisfy (e.g., is greater than) the count threshold 168, the firewall filter rule generator 102 may reduce the count of the rule elements 166 by consolidating two or more of the rule elements 166, as further described with reference to FIG. 2. In an illustrative non-limiting example, the firewall filter rule generator 162 may use distance measures during rule consolidation. To illustrate, firewall filter rule generator 162 may the determine the distance measures 176 corresponding to the rule elements 166 based on the weights 174, as further described with reference to FIG. 2.

The firewall filter rule generator 162 may iteratively consolidate the rule elements 166 until determining that the count of the consolidated rule elements 166 satisfies the count threshold 168. During each iteration, the firewall filter rule generator 162 may update the distance measures 176 based on the consolidated rule elements 166. The firewall filter rule generator 162 may combine a pair of rule elements corresponding to a particular distance measure (e.g., a lowest distance measure) of the distance measures 176.

Once the number of the (consolidated) rule elements 166 satisfies the count threshold 168, the firewall filter rule generator 162 may generate the firewall filter rules 172 based on the rule elements 166. In some examples, the firewall filter rules 172 correspond to a configuration file in a supported filter format, and each of the firewall filter rules 172 is represented by a tuple corresponding to a particular one of the (consolidated) rule elements 166.

The firewall filter rule generator 162 may provide the firewall filter rules 172 to the communication controller 104. The communication controller 104 may filter packets of the network 140 based on the firewall filter rules 172, as further described with reference to FIGS. 3-4. For example, the communication controller 104 may forward a packet to a destination address of the packet in response to determining that the packet satisfies (e.g., matches) at least one of the firewall filter rules 172. Alternatively, the communication controller 104 may drop (e.g., refrain from forwarding) the packet to the destination address in response to determining that the packet does not satisfy any of the firewall filter rules 172.

Whereas the foregoing describes automatic generation of the firewall filter rules 172 based on emulated or actual network activity, it is to be understood that the firewall filter rules 172 may alternatively or additionally be generated based on other types of data. In a particular aspect, the packet data 170 may correspond to a first context, and the firewall filter rules 172 may be applicable to the network 140 in the first context. When the network 140 is implemented or planned for deployment in an aircraft, such context may include at least one of a type, a model, or an operating mode of the aircraft. The operating mode may include a parked mode, a push back mode, a taxi mode, a take-off mode, a climb mode, a cruise mode, a descent mode, a final approach mode, or a landing mode. The packet data 170 may indicate authorized traffic of the network 140 generated during a mode of the aircraft 102 corresponding to the first context. Similarly, the device 160 may obtain second packet data corresponding to a second context and the firewall filter rule generator 162 may generate second set of firewall filter rules based on the second packet data. The firewall filter rule generator 162 may provide the firewall filter rules 172 and the second firewall filter rules to the communication controller 104. Each set of firewall filter rules generated by the firewall filter rule generator 162 may be based on rule elements that satisfy the count threshold 168.

The communication controller 104 may be configured to route packets based on the firewall filter rules 172. For example, the communication controller 104 may forward a packet to a destination address in response to determining that the packet satisfies at least one of the firewall filter rules 172. To illustrate, the communication controller 104 may forward a packet to a destination address in response to determining that a first firewall filter rule of the firewall filter rules 172 indicates that traffic is authorized from a source address of the packet to the destination address. Alternatively, the communication controller 104 may drop a packet in response to determining that the packet does not satisfy any of the firewall filter rules 172.

The system 100 may thus enable automatic generation of firewall filter rules based on emulated network traffic while consolidating rules to keep a total number of the firewall filter rules less than a threshold. Generating the firewall filter rules based on the emulated network traffic (as opposed to traffic observed during actual network operation) may enable the firewall filter rules to be generated automatically, relatively quickly, and covering cases that occur infrequently during actual network operation. Further, when network emulation is used, the firewall filter rules may be generated in an "offline" scenario, which may be simpler than monitoring actual network operation in an aircraft while an aircraft operates in various operation modes (e.g., parked, taxiing, ascending, cruising, descending, landing, etc.). Consolidation of firewall filter rules may also reduce and amount of memory used to store the firewall filter rules.

Additionally, generating the firewall filter rules based on the emulated network traffic may ensure that the firewall filter rules are based on authorized traffic, and not based on unauthorized traffic of the actual network that has escaped identification as unauthorized traffic. Further, by consolidating firewall filter rules as applicable, fewer rules may be analyzed during routing operation, which may reduce an overall delay associated with packet routing.

Referring to FIG. 2, a diagram is shown and generally designated 200. The diagram 200 illustrates an example of generating the rule elements 166 based on the packet data 170.

The packet data 170 indicates that a source address field of a packet header of the packet 120 indicates an address 238 of the operational unit 110, a source port field of the packet header indicates a port 232 of the operational unit 110, a destination address field of the packet header indicates an address 230 of the ground control device 107, a destination port field of the packet header indicates a port 236 of the ground control device 107, a protocol field of the packet header indicates a protocol 254, or a combination thereof. Similarly, the packet data 170 indicates, for the packets 122, 124, 126, 128, respective source addresses 266, 248, 252, 238, source ports 234, 244, 250, 264, destination addresses 248, 266, 266, 240, destination ports 242, 246, 262, 265, and protocols 256, 258, 260, 269.

The firewall filter rule generator 162 of FIG. 1 may generate one or more rule elements (REs) 267 based on the packet data 170. For example, the firewall filter rule generator 162 may generate a rule element (RE) 202 based on the packet data 170 for the packet 120. In the RE 202, a first address range field indicates the address 238, a first port field indicates the port 232, a second address range field indicates the address 230, a second port field indicates the port 236, and a protocol field indicates the protocol 254. The first address range field may correspond to a source address range and the second address range field may correspond to a destination address range, or vice versa.

A direction field of the RE 202 may indicate a first direction, represented in FIG. 2 by a left-to-right arrow. The first direction may indicate that traffic is authorized from the address 238, the port 232, or both, to the address 230, the port 236, or both. Similarly, the firewall filter rule generator 162 may generate a REs 204, 206, 208, 209 corresponding to the packets 122, 124, 126, 128. A priority field of each of the REs 267 has a value of 1, indicating that each of the REs 267 is an unconsolidated RE (e.g., generated from a single packet without combining multiple REs). The priorities of REs may be used to determine a sorted order in which to apply filter rules derived from the REs, as further described herein.

As described with reference to FIG. 1, in some situations, the firewall filter rule generator 162 consolidates rule elements. For example, the firewall filter rule generator 162 may determine whether a count (e.g., 5) of the REs 267 satisfies the count threshold 168. The firewall filter rule generator 162 may determine whether to consolidate the REs 267 or to generate the firewall filter rules 172 based on the REs 267 without consolidation based on whether the count of the REs 267 satisfies the count threshold 168.

In some examples, the firewall filter rule generator 162 may determine the distance measures 176 corresponding to the REs 267 based on the weights 174. For example, the firewall filter rule generator 162 may determine a first distance measure, a second distance measure, a third distance measure, and a fourth distance measure based on a comparison of the RE 202 to each of the other REs 204, 206, 208, and 209. Additional distance measures may be determined by comparing other pairs of the REs 267.

In some examples, a distance measure between a first RE (FR1) and a second RE (FR2) may be determined based on the following sequence of mathematical operations. The first RE (FR1) may be represented by the following Equation:

$$FR1 = (RSIP1, RDIP1, DPort1, SPort1, Proto1, Direction1),\quad \text{Equation 1}$$

where RSIP1 corresponds to a first address range indicated by a first address range field of FR1, RDIP1 corresponds to a second address range indicated by a second address range field of FR1, SPort1 corresponds to a first port (or a first port range) indicated by a first port field of FR1, DPort1 corresponds to a second port (or a second port range) indicated by a second port field of FR1, Proto1 corresponds to a protocol indicated by a protocol field of FR1, and Direction1 corresponds to a direction indicated by a direction field of FR1.

Similarly, the second RE (FR2) may be represented by the following Equation:

$$FR2 = (RSIP2, RDIP2, DPort2, SPort2, Proto2, Direction2),\quad \text{Equation 2}$$

The firewall filter rule generator 162 may determine the distance measure between FR1 and FR2 based on the following Equation:

$$D_{FR1|FR2} = \alpha * D_{RSIP1|RSIP2} + \beta * D_{RDIP1|RDIP2} + \gamma * D_{DPort1|DPort2},\quad \text{Equation 3}$$

where $D_{FR1|FR2}$ corresponds to the distance measure between FR1 and FR2, α corresponds to a first weight of the weights 174, β corresponds to a second weight of the weights 174, γ corresponds to a third weight of the weights 174, $D_{RSIP1|RSIP2}$ corresponds to a difference between RSIP1 and RSIP2, $D_{RDIP1|RDIP2}$ corresponds to a difference between RDIP1 and RDIP2, and $D_{DPort1|DPort2}$ corresponds to a difference between DPort1 and DPort2. In a particular implementation, such as when the destination ports are the same, γ is equal to zero, i.e., the distance measure between FR1 and FR2 may be based on $D_{RSIP1|RSIP2}$ and $D_{RDIP1|RDIP2}$, but not $D_{DPort1|DPort2}$.

When a ranges of addresses or ports are present rather than individual addresses or ports, the firewall filter rule generator 162 may determine a difference between a first range Rx=Xmax) and a second range Ry=(Ymin, Ymax) based on the following Equation:

$$D_{Rx|Ry} = \begin{cases} 0, & \text{when } (X\min \le Y\max \text{ and } X\min \ge Y\min) \text{ or } \\ & (Y\min \le X\max \text{ and } Y\min \ge X\min) \\ (X\min - Y\max)^2, & \text{when } X\min > Y\max \\ (Y\min - X\max)^2, & \text{when } Y\min > X\max \end{cases},\quad \text{Equation 4}$$

In accordance with Equation 4, the firewall filter rule generator 162 may determine that the difference between the first range Rx and the second range Ry is 0 in response to determining that the first range Rx overlaps the second range Ry. The firewall filter rule generator 162 may, in response to determining that the first range Rx does not overlap the second range Ry, determine the difference between the first range Rx and the second Ry based on a particular function (e.g., a square function or an absolute value function) of a difference between a maximum value of the lower of the first range Rx and the second range Ry and a minimum value of the higher of the first range Rx and the second range Ry.

In a particular aspect, the firewall filter rule generator 162 may determine the distance measure between FR1 and FR2 in response to determining that a second port (DPort1) of FR1 is the same as a second port (DPort2) of FR2. Alternatively, the firewall filter rule generator 162 may refrain from determining the distance measure between FR1 and FR2 in response to determining that DPort1 is distinct from DPort2.

In a particular aspect, the firewall filter rule generator 162 may determine the distance measure between FR1 and FR2 based on the following Equation:

$$D_{FR1|FR2} = \alpha * D_{RSIP1|RDIP2} + \beta * D_{RDIP1|RSIP2} + \gamma * D_{DPort1|SPort2}, \quad \text{Equation 5}$$

where $D_{RSIP1|RDIP2}$ corresponds to a difference between RSIP1 and RDIP2, $D_{RDIP1|RSIP2}$ corresponds to a difference between RDIP1 and RSIP2, and $D_{DPort1|SPort2}$ corresponds to a difference between DPort1 and SPort2. In a particular implementation, as described with reference to Equation 3, $\gamma$ may be equal to zero. Thus, Equation 3 weights a difference between source addresses of different devices and a difference between destination addresses of different devices, whereas Equation 5 weights differences between the source and destination address of each individual device.

In a particular implementation, the firewall filter rule generator 162 may select Equation 5 rather than Equation 3 to determine a distance measure in response to determining that RSIP1 overlaps RDIP2, RDIP1 overlaps RSIP2, or both. Alternatively, the firewall filter rule generator 162 may select Equation 3 rather than Equation 5 in response to determining that RSIP1 does not overlap RDIP2 and that RDIP1 does not overlap RSIP2.

In a particular implementation, the firewall filter rule generator 162 may select Equation 3 in response to determining that RSIP1 overlaps RSIP2, RDIP1 overlaps RDIP2, or both. Alternatively, the firewall filter rule generator 162 may select Equation 5 in response to determining that RSIP1 does not overlap RSIP2 and that RDIP1 does not overlap RDIP2.

In a particular aspect, the firewall filter rule generator 162 may have access to related address ranges stored at the memory 164. To illustrate, a first related address range may indicate addresses used for entertainment devices of the network 140, a second related address range may indicate addresses used for operational units of the network 140, a third related address range may indicate addresses used for devices external to the network 140, etc. When related address ranges are known, the firewall filter rule generator 162 may select Equation 5 in response to determining that RSIP1 and RDIP2 are included in the same related address range, that RDIP1 and RSIP2 are included in the same related address range, or both. Alternatively, the firewall filter rule generator 162 may select Equation 3 in response to determining that RSIP1 and RSIP2 are included in the same related address range, that RDIP1 and RDIP2 are included in the same related address range, or both.

In a particular aspect, the firewall filter rule generator 162 may, when Equation 5 is selected, refrain from determining the distance measure between FR1 and FR2 unless DPort1 is the same as SPort2. In a particular aspect, the firewall filter rule generator 162 may determine (e.g., based on Equation 5) that the particular distance measure is 0 in response to determining that RSIP1 overlaps RDIP2 and that RDIP1 overlaps RSIP2.

After determining distance measures between the REs 267, the firewall filter rule generator 162 may consolidate the pair of REs having a lowest of the determined distance measures. For example, assume that the distance measure between the REs 204 and 206 has the lowest value (e.g., zero). A RE 210 may be generated by consolidating the REs 204 and 206. Consolidation of REs may be based on the following Equation:

$$FR1+FR2=(RSIP1+RSIP2, RDIP1+RDIP2, DPort, SPort, Proto, Direction), \quad \text{Equation 6}$$

where FR1+FR2 corresponds to a consolidated RE.

In a particular example when consolidating according to Equation 6, DPort (i.e., the destination port or port range of the consolidated rule element generated by consolidating the rule elements FR1 and FR2) is set to DPort1 when DPort1 is the same as DPort2. Alternatively, DPort may be set to "ANY PORT" when DPort1 is distinct from DPort2 or when at least one of DPort1 or DPort2 is "ANY PORT." In an alternative implementation, DPort may be equal to a set that includes both DPort1 and DPort2 when DPort1 is distinct from DPort2. If DPort1 and DPort2 both represent port ranges instead of individual ports, DPort may be equal to a port range that includes the ranges of DPort1 and DPort2.

In a particular example when consolidating according to Equation 6, SPort (i.e., the source port or port range of the consolidated rule element generated by consolidating the rule elements FR1 and FR2) is set to SPort1 when SPort1 is the same as SPort2. Alternatively, SPort may be set to "ANY PORT" when SPort1 is distinct from SPort2 or when at least one of SPort1 or SPort2 is "ANY PORT." In an alternative implementation, SPort may be equal to a set that includes both SPort1 and SPort2 when SPort1 is distinct from SPort2. If SPort1 and SPort2 both represent port ranges instead of individual ports, SPort may be equal to a port range that includes the ranges of SPort1 and SPort2.

In a particular example when consolidating according to Equation 6, Proto (i.e., the protocol of the consolidated rule element generated by consolidating the rule elements FR1 and FR2) is set to Proto1 when Proto1 is the same as Proto2. Proto may be set to "ANY PROTO" when Proto1 is distinct from Proto2 or when at least one of Proto1 or Proto2 is "ANY PROTO." In an alternative implementation, Proto may be equal to a set including Proto1 and Proto2 when Proto1 is distinct from Proto2.

In a particular example when consolidating according to Equation 6, Direction (i.e., the direction of the consolidated rule element generated by consolidating the rule elements FR1 and FR2) may be set to Direction1 when Direction1 is the same as Direction2. Direction may be set to "BIDIRECTIONAL" when at least one of Direction1 or Direction2 is "BIDIRECTIONAL" or when Direction1 is distinct from Direction2.

When rule elements being consolidated include ranges, the firewall filter rule generator 162 may combine the ranges when generating the consolidated rule element. To illustrate, a first range Rx=(Xmin, Xmax) and a second range Ry=(Ymin, Ymax) may be consolidated based on the following Equation:

$$Rx+Ry=(\min(X\min, Y\min), \max(X\max, Y\max)), \quad \text{Equation 7}$$

In a particular aspect, the firewall filter rule generator 162 may consolidate a first RE (FR1) of the REs 267 and a second RE (FR2) of the REs 267 based on the following Equation:

$$FR1+FR2=(RSIP1+RDIP2, RDIP1+RSIP2, DPort, SPort, Proto, Direction), \quad \text{Equation 8}$$

It is noted that the difference between Equation 8 and Equation 6 is analogous to the difference between Equation 3 and Equation 5. As described above, when consolidating according to Equation 6, the value of DPort may be determined based on DPort1 and DPort2 and the value of SPort may be determined based on SPort1 and SPort2. In contrast, when consolidating according to Equation 8, the value of DPort may be based on DPort1 and SPort2, and the value of SPort may be based on SPort1 and DPort2.

In a particular example when consolidating according to Equation 8, Direction may be set to "BIDIRECTIONAL" when Direction1 is the same as Direction2 or when at least one of the Direction1 or Direction2 is "BIDIRECTIONAL." Direction may be set to Direction1 when Direction1 is distinct from Direction2, Direction1 is not "BIDIRECTIONAL", and Direction2 is not "BIDIRECTIONAL."

The firewall filter rule generator 162 may select either Equation 6 or Equation 8 to consolidate FR1 and FR2. For example, Equation 6 may be selected when the distance measure between FR1 and FR2 was determined based on Equation 3, and Equation 8 may be selected when the distance measure between FR1 and FR2 was determined based on Equation 5.

In the example of FIG. 2, the consolidated RE 210 is generated by consolidating the RE 204 and the RE 206 based on Equation 8. For example, a first address range field of the RE 210 may indicate the first address range (e.g., the address 266) of the RE 204+the second address range (e.g., the address 266) of the RE 206. To illustrate, the first address range field of the RE 210 may indicate the address 266. A second address range field of the RE 210 may indicate the second address range (e.g., the address 248) of the RE 204+the first address range (e.g., the address 248) of the RE 206. To illustrate, the second address range field of the RE 210 may indicate the address 248. The firewall filter rule generator 162 may set SPort to indicate "ANY PORT" in response to determining that the port 234 is distinct from the port 246. The firewall filter rule generator 162 may set DPort to indicate "ANY PORT" in response to determining that the port 242 is distinct from the port 244. The firewall filter rule generator 162 may set Proto to indicate a set that includes the protocol 256 and the protocol 258 of the RE 208. The firewall filter rule generator 162 may set the Direction to indicate "BIDIRECTIONAL" in response to determining that a direction of the RE 204 is the same as a direction of the RE 206. The priority field of the RE 210 indicates that two REs 204, 206 were consolidated to generate the RE 210.

REs 268 may thus be a consolidated version of the REs 267, and may include the bidirectional consolidated RE 210 instead of the individual unidirectional REs 204, 206. In some examples, the consolidated RE 210 may authorize more types of traffic than the RE 204 and the RE 206. For example, the consolidated RE 210 may indicate that traffic between any port of the address 266 of the proxy server 105 and any port of the address 248 of the entertainment device 111 is authorized.

The above described consolidation process may be iteratively repeated until a count of REs satisfies the count threshold 168. During each iteration, distance measures may be updated. In the example of FIG. 2, the REs 268 are further consolidated to generate the REs 270, in which the REs 208 and 210 are replaced by an RE 212. The REs 270 are still further consolidated to generate the REs 272, in which the REs 202, 209 are replaced by an RE 214.

When the count of REs satisfies the count threshold 168, the firewall filter rule generator 162 may generate the firewall filter rules 172 based on the REs. For example, the count (e.g., 2) of the REs 272 may satisfy the count threshold 168 and the firewall filter rules 172 may be generated based on the REs 272.

In a particular aspect, the firewall filter rule generator 162 may determine priorities of the firewall filter rules 172 based on the priority fields of the REs 272. As described above, the value in the priority field of a RE may indicate the number of other REs that were consolidated to generate that RE. In the example of FIG. 2, the RE 212 (which has a priority of 3) is higher priority than the RE 214 (which has a priority of 2). During firewall filtering operations, filter rules derived from higher priority REs may be applied prior to application of filter rules derived from lower priority REs, as further described with reference to FIGS. 3-4.

In a particular aspect, the firewall filter rule generator 162 may refrain from determining a distance measure corresponding to a particular pair of address ranges. For example, the firewall filter rule generator 162 may, in response to determining that a first address range and a second address range are not included in the same related address range, refrain from determining a difference between the first address range and the second address range. In this example, the firewall filter rule generator 162 may consolidate a pair of REs by combining addresses ranges that are included in the same related address range and may refrain from combining address ranges that are included in distinct related address ranges.

In a particular aspect, the firewall filter rule generator 162 may refrain from determining a distance measure based on a difference between addresses (e.g., the address 230 and the address 240) in response to determining that the addresses are included in distinct (e.g., non-overlapping) related address ranges. To illustrate, the RE 202 may not be consolidated with the RE 209 because the RE 202 corresponds to a first related address range for communication with devices external to the network 140, whereas the RE 209 corresponds to a second related address for communication amongst operational devices of the network 140.

In a particular implementation, the firewall filter rule generator 162 may, in response to determining that a first address range or a second address range is included in a particular related address range, refrain from determining a difference between the first address range and the second address range. In this example, the firewall filter rule generator 162 may consolidate a pair of REs by combining addresses ranges that are included in some related address ranges and may refrain from combining address ranges that are included other related address ranges. For example, the firewall filter rule generator 162 may, in response to determining that the address 230 of the ground control device 107 is included in a first related address range, refrain from determining a distance measure based on a difference between the address 230 and the address 240 of the operational unit 114. The firewall filter rule generator 162 may thus refrain from consolidating the RE 202 and the RE 209 to prevent generation of a consolidated RE that authorizes traffic to/from a first external device based on packet data indicating authorized traffic corresponding to a second external device.

FIG. 2 thus illustrates an example of iteratively consolidating rule elements. For example, rule elements may be consolidated until a count of the rule elements satisfies a count threshold.

Figure 3:
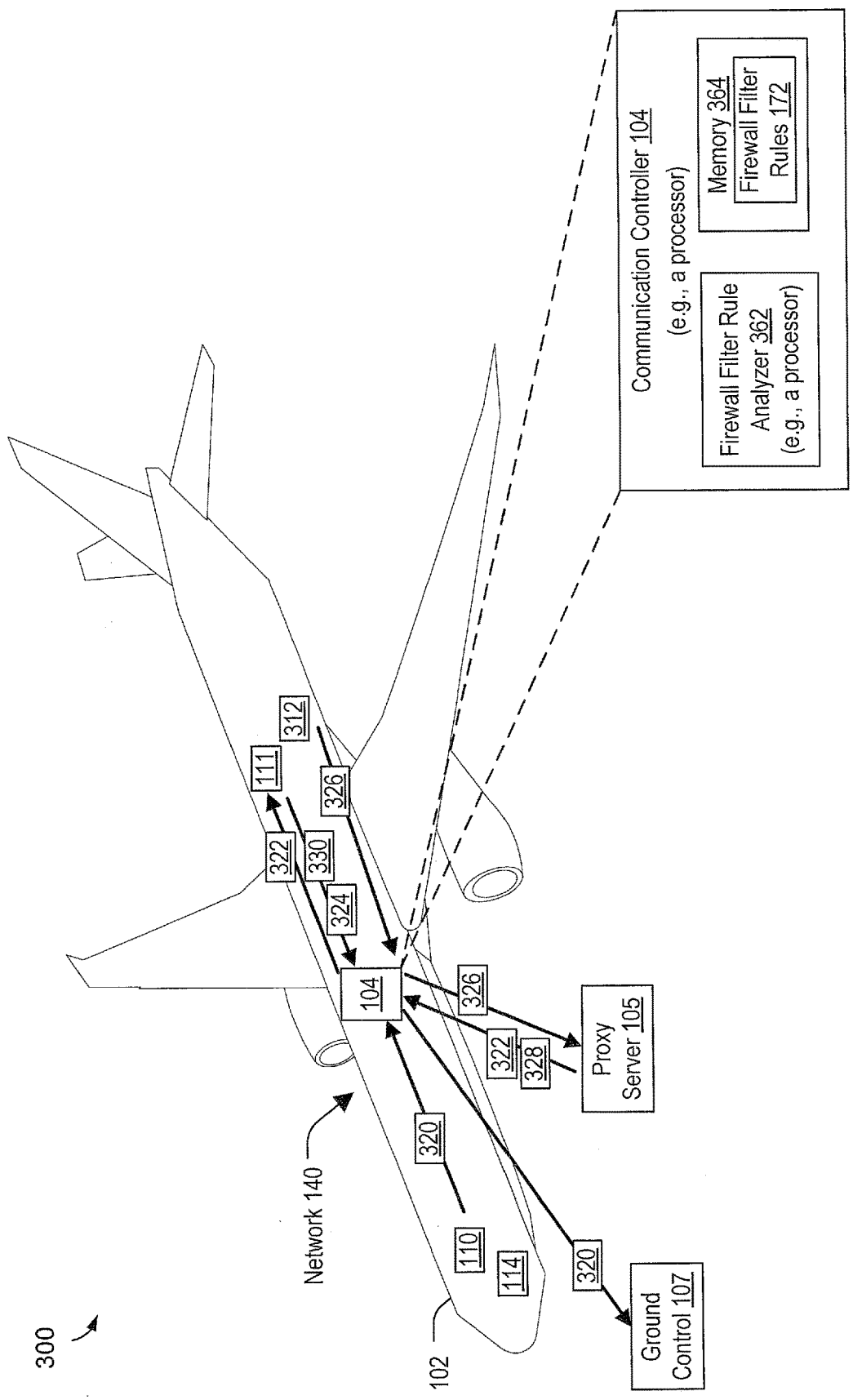
FIG. 3 is a diagram of a system that includes a device operable to use firewall filter rules to filter packets.

Referring to FIG. 3, a system is shown and generally designated 300. The system 300 includes the aircraft 102 and the communication controller 104 configured to route packets of the network 140.

The communication controller 104 includes a firewall filter rule analyzer 362 (e.g., a processor) coupled to a memory 364. The memory 364 may include or correspond to a volatile memory, a non-volatile memory, or a combination thereof. The memory 364 may be configured to store data. For example, the memory 364 may store the firewall filter rules 172. The firewall filter rule analyzer 362 may be configured to filter packets of the network 140 based on the firewall filter rules 172, as described herein. The communication controller 104 may receive the firewall filter rules 172 from the device 160 of FIG. 1.

During operation, the communication controller 104 may receive one or more packets. For example, the communication controller 104 may receive a packet 320 from the operational unit 110, a packet 322 from the proxy server 105, a packet 324 from the entertainment device 111, a packet 326 from an entertainment device 312, a packet 328 from the proxy server 105, a packet 330 from the entertainment device 312, or a combination thereof. The communication controller 104 may forward a packet to a destination address specified by the packet in response to determining that the packet satisfies at least one of the firewall filter rules 172, as further described with reference to FIG. 4. For example, the communication controller 104 may forward the packet 320, the packet 322, the packet 326, or a combination thereof, as further described with reference to FIG. 4.

Alternatively, or in addition the communication controller 104 may drop (e.g., refrain from forwarding) a packet to the destination address specified by the packet in response to determining that the packet does not satisfy any of the firewall filter rules 172, as further described with reference to FIG. 4. For example, the communication controller 104 may drop the packet 324, the packet 328, the packet 330, or a combination thereof, as further described with reference to FIG. 4.

In a particular implementation, the firewall filter rules 172 may indicate conditions that correspond to unauthorized traffic of the network 140. For example, the packet data 170 may be descriptive of unauthorized traffic of the network 140 and the firewall filter rule generator 162 of FIG. 1 may generate the firewall filter rules 172 based on such packet data 170, as described with reference to FIGS. 1-2. As another example, the packet data 170 may be descriptive of authorized traffic of the network 140, and the firewall filter rule generator 162 of FIG. 1 may generate intermediate firewall filter rules based on such packet data 170 (as described with reference to FIGS. 1-2), and may generate the firewall filter rules 172 based on an inverse of the intermediate firewall filter rules. In this implementation, the firewall filter rule analyzer 362 may drop a packet in response to determining that the packet satisfies at least one of the firewall filter rules 172. Alternatively, the firewall filter rule analyzer 362 may forward the packet to the destination address in response to determining that the packet does not satisfy any of the firewall filter rules 172.

In a particular aspect, as described with reference to FIG. 1, the communication controller 104 may receive sets of firewall filter rules corresponding to multiple contexts. For example, the communication controller 104 may receive the firewall filter rules 172 corresponding to a first context, second firewall filter rules corresponding to a second context, one or more additional firewall filter rules, or a combination thereof. The communication controller 104 may detect the first context in response to determining that the aircraft 102 is operating in a first mode. For example, the communication controller 104 may detect the first context in response to receiving an input from an operational unit of the aircraft 102 indicating the first mode (e.g., a parked mode, a push back mode, a taxi mode, a take-off mode, a climb mode, a cruise mode, a descent mode, a final approach mode, or a landing mode). The communication controller 104 may, in response to detecting the first context, filter one or more packets based on the firewall filter rules 172 corresponding to the first context. The communication controller 104 may, in response to detecting a second context, filter one or more packets based on the second firewall filter rules corresponding to the second context.

In a particular implementation, the communication controller 104 may apply the firewall filter rules 172 to a packet based on priorities of the firewall filter rules 172. For example, the communication controller 104 may apply the firewall filter rules 172 in decreasing order of priority until a packet satisfies one of the firewall filter rules 172 until it is determined that the packet does not satisfy any of the firewall filter rules 172. To illustrate, the communication controller 104 may determine a sorted order of the firewall filter rules 172 based on their corresponding priorities and may apply the firewall filter rules 172 to packets based on the sorted order.

The system 300 may thus enable filtering packets based on the firewall filter rules that are applicable to a "current" context (e.g., operation mode of an aircraft). The ability to apply context-specific filtering rules may reduce a total number of firewall filter rules applied to a packet at a given time. Moreover, by applying filtering rules in a sorted order based on rule priority, rules that are likely to be satisfied by a higher number of packets may be applied first, thereby reducing a total number comparison operations that are performed before a packet is routed.

Referring to FIG. 4, a diagram is shown and generally designated 400. The diagram 400 illustrates an example of filtering packets based on the firewall filter rules 172.

The firewall filter rules 172 may include a firewall filter rule (FFR) 402, a FFR 404, or both. In the example of FIG. 4, the firewall filter rules 172 are based on the REs 272 of FIG. 2. For example, the firewall filter rule generator 162 of FIG. 1 may generate the FFR 402 based on the RE 214. Thus, for the FFR 402, the firewall filter rule generator 162 may set a first address range field to the address range 238, a first port field to "ANY," a second address range field to 230≤240, a second port field to "ANY," a direction field to the first direction (e.g., represented by the left-to-right arrow), a protocol field to 254, 269, a priority field to 2, or a combination thereof. The firewall filter rule generator 162 may similarly generate the FFR 404 based on the RE 212.

The firewall filter rule analyzer 362 of FIG. 3 may filter one or more packets based on the firewall filter rules 172. For example, the firewall filter rule analyzer 362 may receive the packet 320, which indicates the address 238 of the operational unit 110 as a source address, the port 232 as a source port, the address 230 of the ground control device 107 as a destination address, the port 236 as a destination port, and the protocol 254.

The firewall filter rule analyzer 362 may determine whether the packet 320 satisfies at least one of the firewall filter rules 172. Because the FFR 404 has a higher priority value than the FFR 402, the FFR 404 may be applied first. The firewall filter rule analyzer 362 may determine that the packet 320 does not satisfy (e.g., does not match) the FFR 404, because the address 238 is not in the first address range of the FFR 404 (i.e., the address 266) or in the second address range of the FFR 404 (i.e., a range from the address 248 to the address 252).

Because the packet 320 does not satisfy the FFR 404, the FFR 402 may be applied. The firewall filter rule analyzer 362 may determine that the packet 320 satisfies the FFR 402, because the address 238, the port 232, the address 230, the port 236, and the protocol 254 of the packet 320 match the first address range (i.e., the address 238), the first port (i.e., ANY PORT), the second address range (i.e., a range from the address 230 to the address 240), the second port (i.e., ANY PORT), and the protocol (e.g., a set including the protocols 254, 269) of the FFR 402, respectively. The firewall filter rule analyzer 362 may, in response to determining that the packet 320 satisfies the FFR 402, forward the packet 320 to the address 230 of the ground control device 107. In FIG. 4, routing decisions are denoted "Pass" and drop decisions are denoted "Reject."

As additional packets are received, the firewall filter rule analyzer 362 may determine whether the additional packets should be routed or dropped based on the firewall filter rules 172. For example, the packet 322 may satisfy the FFR 404, and may thus be forwarded the packet 322 to the address 248 of the entertainment device 111. As another example, the packet 324 does not satisfy any of the firewall filter rules 172 and may therefore be dropped. Accordingly, the firewall filter rule analyzer 362 may thus enable communication from a first set of devices of the network 140 to an external device while disabling communication between a second set of devices of the network 140 and the external device.

The packet 326, which is sent from a port 450 and an address 251 of the entertainment device 312 to the port 262 and the address 266 of the proxy server 105, may be determined to satisfy the FFR 404, and may therefore be routed to the address 266 of the proxy server 105. The firewall filter rule analyzer 362 may thus automatically enable communication with a device that is not indicated in the packet data 170 of FIG. 1 when an address of the device is included in an address range indicated by a particular FFR of the firewall filter rules 172. The packets 328, 330 may not satisfy any of the firewall filter rules 172, and may therefore be dropped.

Figure 5:
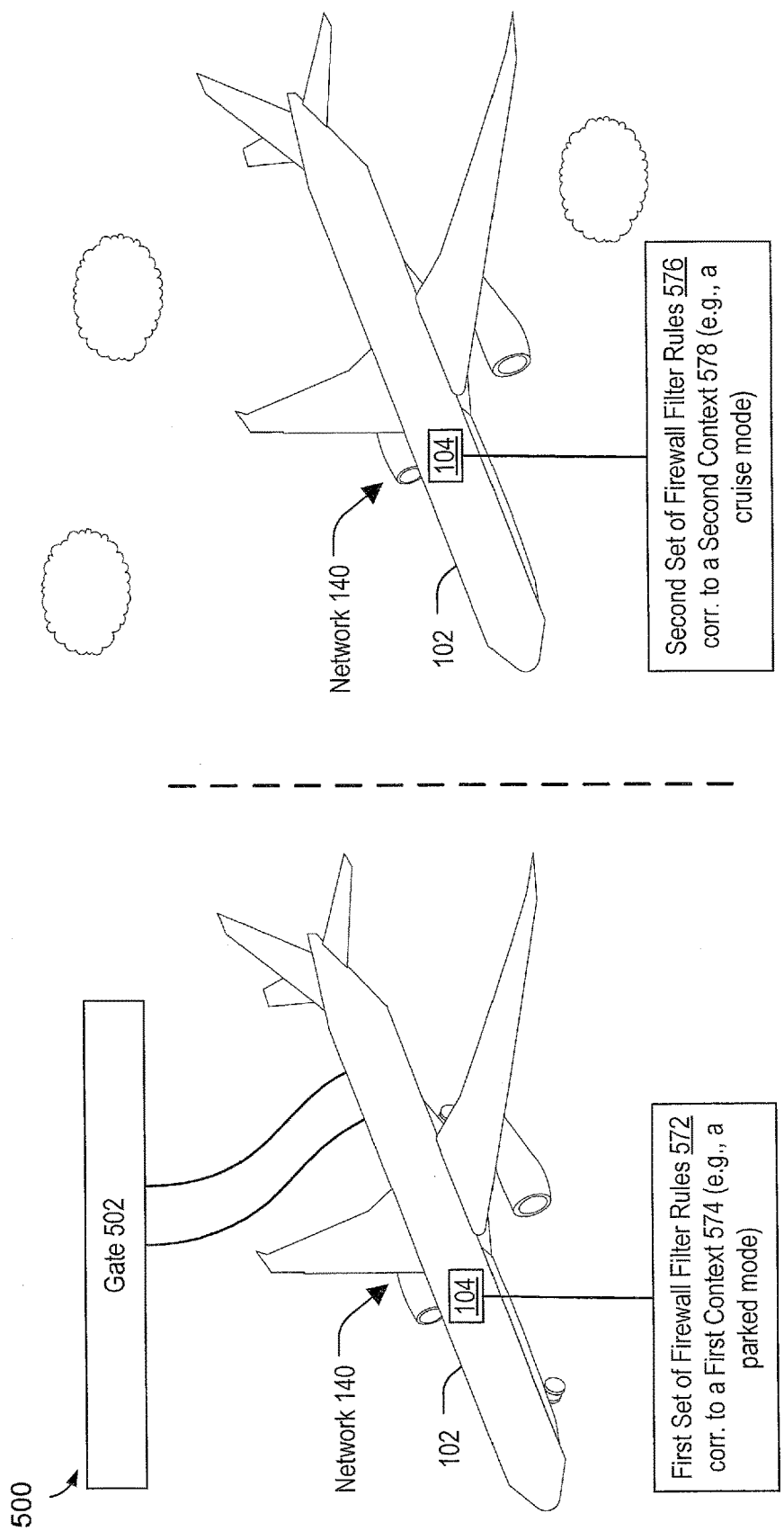
FIG. 5 is a diagram that illustrates an example of selecting firewall filter rules based on context.

Although comparison to a single set of firewall filter rules 172 is described, it is to be understood that in some examples, different sets of firewall filter rules may be generated for different contexts. In such examples, a received packet may be compared to an "active" set of firewall filter rules that correspond to a "current" context, such as a current operating mode of an aircraft. For example, FIG. 5 depicts a diagram 500 of applying different sets of firewall filter rules in different contexts. In particular, FIG. 5 illustrates the aircraft 102 in a first context 574 and in a second context 578. The first context 574 may correspond to a first operation mode (e.g., a parked mode) of the aircraft 102. For example, the aircraft 102 may have the first context 574 while the aircraft 102 is parked at a gate 502 of an airport. The second context 578 may correspond to a second operation mode (e.g., a cruise mode) of the aircraft 102. For example, the aircraft 102 may have the second context 578 while the aircraft 102 is at a cruising altitude.

The communication controller 104 may have access to at least one of a first set of firewall filter rules 572 or a second set of firewall filter rules 576. The first set of firewall filter rules 572, the second set of firewall filter rules 576, or both, may correspond to the firewall filter rules 172 of FIG. 1. The first set of firewall filter rules 572 may be associated with the first context 574. For example, the firewall filter rule generator 162 may generate the first set of firewall filter rules 572 based on packet data that is descriptive of traffic that is authorized in the network 140 during the first operation mode of the aircraft 102, as described with reference to FIGS. 1-2. The second set of firewall filter rules 576 may be associated with the second context 578. For example, the firewall filter rule generator 162 may generate the second firewall filter rules 576 based on packet data that is descriptive of traffic that is authorized in the network 140 during the second operation mode of the aircraft 102.

During operation, the communication controller 104 may detect the first context 574 corresponding to the first operation mode of the aircraft 102. For example, the communication controller 104 may detect the first operation mode (e.g., a parked mode) of the aircraft 102 in response to receiving an input (e.g., indicating an activated state) from a component (e.g., a parking brake) of the aircraft 102. The communication controller 104 may, in response to detecting the first operation mode, select the first set of firewall filter rules 572 to be applied to network traffic while the aircraft 102 is in the first operation mode. The communication controller 104 may apply the first set of firewall filter rules 572 to the network 140. For example, while the aircraft 102 is parked at the gate 502, the firewall filter rule analyzer 362 of FIG. 3 may filter one or more packets of the network 140 based on the first set of firewall filter rules 572, as described with reference to FIGS. 3-4.

In an illustrative non-limiting example, the first set of firewall filter rules 572 may indicate that packets corresponding to video-streaming are not authorized to be exchanged with entertainment devices of the aircraft 102. For example, a packet indicating a port (e.g., port 80) associated with video-streaming and the address 248 of the entertainment device 111 may fail to satisfy any of the first set of firewall filter rules 572. The firewall filter rule analyzer 362 may drop the packet in response to determining that the packet does not satisfy any of the first set of firewall filter rules 572. The first set of firewall filter rules 572 may thus restrict video-streaming by passengers while the aircraft 102 is parked at the gate 502.

During operation of the aircraft 102, the operation mode of the aircraft 102 may change, and the communication controller 104 may detect the second context 578 corresponding to the second operation mode of the aircraft 102. For example, the communication controller 104 may detect the second operation mode (e.g., a cruise mode) of the aircraft 102 in response to receiving an input (e.g., indicating an activated state) from a component (e.g., a flight control system) of the aircraft 102. The communication controller 104 may, in response to detecting the second operation mode, select the second set of firewall filter rules 576 to be applied to network traffic while the aircraft 102 is in the second operation mode. The communication controller 104 may apply the second set of firewall filter rules 576 to the network 140. For example, while the aircraft 102 is at cruising altitude, the firewall filter rule analyzer 362 of FIG. 3 may filter one or more packets of the network 140 based on the second set of firewall filter rules 576, as described with reference to FIGS. 3-4.

In an illustrative non-limiting example, the second set of firewall filter rules 576 may indicate that packets corresponding to video-streaming are authorized to be exchanged with entertainment devices of the aircraft 102. For example, a packet indicating the port (e.g., port 80) associated with video-streaming and the address 248 of the entertainment device 111 as a destination address may satisfy at least one of the second set of firewall filter rules 576. The firewall filter rule analyzer 362 may forward the packet to the entertainment device 111 in response to determining that the packet satisfies at least one of the second set of firewall filter rules 576. The second set of firewall filter rules 576 may thus allow video-streaming by passengers while the aircraft 102 is at cruising altitude.

Thus, as shown in FIG. 5, the communication controller 104 may dynamically select an applicable set of firewall filter rules based on a detected context, such as an operation mode of the aircraft 102. The communication controller 104 may apply the selected set of firewall filter rules to the network 140 in response to detecting the context.

Figure 6:
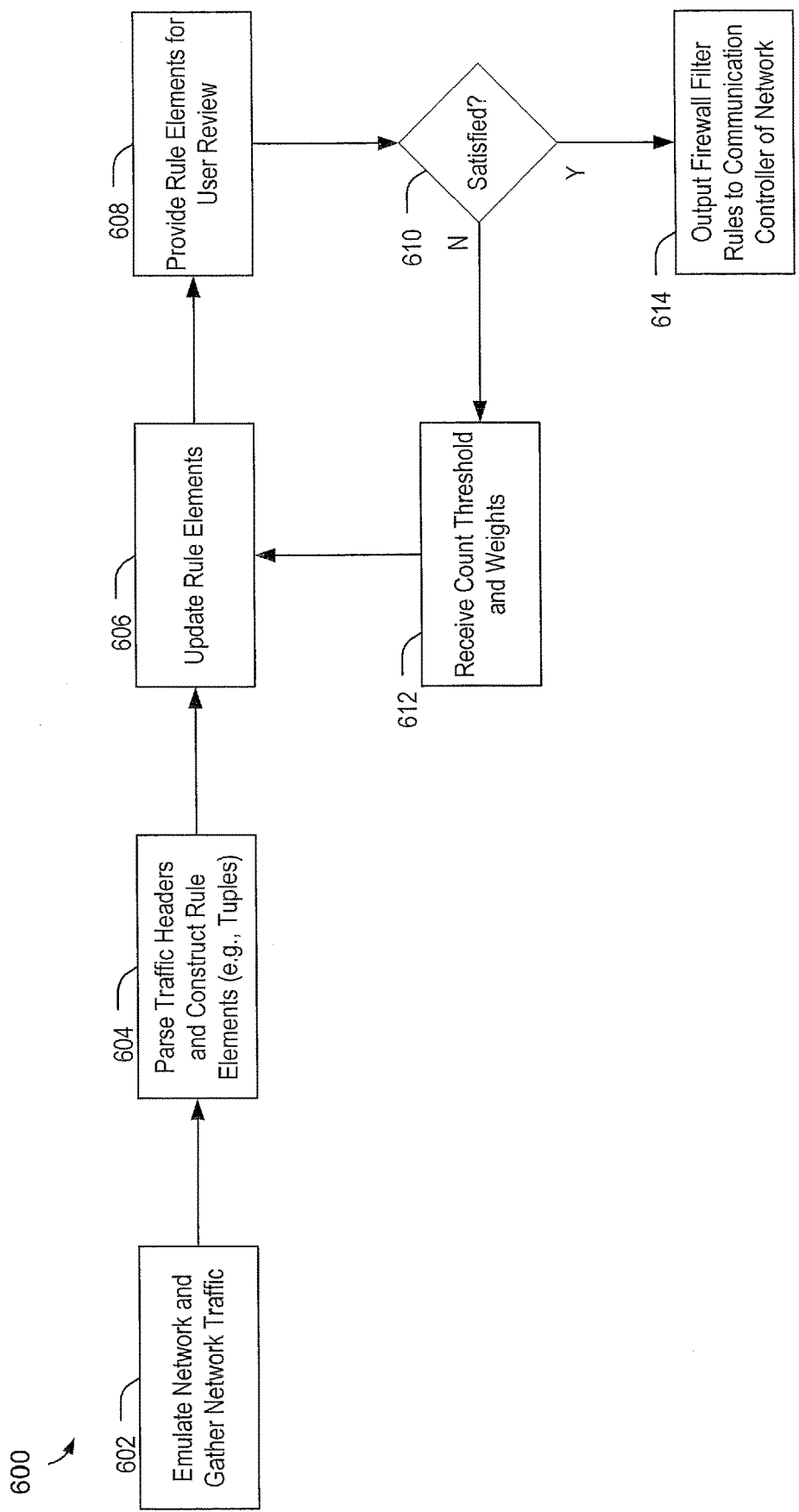
FIG. 6 is a flow chart of an example of a method of generating firewall filter rules.

Referring to FIG. 6, a method of operation is shown and generally designated 600. The method 600 may be performed by the firewall filter rule generator 162, the device 160, the aircraft 102, the system 100 of FIG. 1, or a combination thereof.

The method 600 includes emulating a network and gathering network traffic, at 602. For example, the device 160 of FIG. 1 may emulate the network 140 and may output the packet data 170 indicating authorized traffic generated in the emulation of the network 140, as described with reference to FIG. 1.

The method 600 also includes parsing traffic headers and constructing rule elements (e.g., tuples), at 604. For example, the firewall filter rule generator 162 of FIG. 1 may generate the rule elements 166 (e.g., tuples) based on the packet data 170, as described with reference to FIGS. 1-2.

The method 600 further includes updating the rule elements, at 606. For example, the firewall filter rule generator 162 of FIG. 1 may selectively consolidate two or more of the rule elements 166, as described with reference to FIGS. 1-2.

The method 600 also includes providing the rule elements for user review, at 608. For example, the firewall filter rule generator 162 of FIG. 1 may provide the rule elements 166 to a display of the device 160. In a particular aspect, the firewall filter rule generator 162 may provide the REs 267, the REs 268, the REs 270, the REs 272 of FIG. 2, or a combination thereof, to the display. The firewall filter rule generator 162 may also provide an indication of a count of the rule elements 166 to the display.

The method 600 further includes determining whether user feedback indicates that the rule elements are satisfactory, at 610. For example, the firewall filter rule generator 162 of FIG. 1 may receive feedback from the user 101 of FIG. 1 indicating whether the rule elements 166 are satisfactory.

The method 600 includes, in response to determining that the user feedback indicates that the rule elements are not satisfactory, receiving a count threshold and weights from the user, at 612, and then proceeding to 606. For example, the firewall filter rule generator 162 of FIG. 1 may provide a user interface to a display of the device 160 including options to update the count threshold 168, one or more of the weights 174, or a combination thereof, and may receive a user input indicating that at least one of the count threshold 168 or the weights 174 is to be updated.

The firewall filter rule generator 162 may update the count threshold 168, the weights 174, or both, based on user input from the user 101. The firewall filter rule generator 162 may determine the rule elements 166 based on the count threshold 168, the weights 174, or both, as described with reference to FIG. 2. In a particular implementation, the firewall filter rule generator 162 may store intermediate REs (e.g., the REs 267, the REs 268, the REs 270, the REs 272 of FIG. 2, or a combination thereof) in the memory 164 of FIG. 1. The firewall filter rule generator 162 may update the rule elements 166 to an intermediate RE (e.g., the REs 270) in response to determining that a count of the intermediate RE satisfies (e.g., is less than or equal to) the updated count threshold 168 (e.g., 3).

Alternatively, in response to determining that the user feedback indicates that the rule elements are satisfactory, the method 600 includes outputting filter firewall rules to a communication controller of the network, at 614. For example, the firewall filter rule generator 162 of FIG. 1 may generate the firewall filter rules 172 based on the rule elements 166, as described with reference to FIG. 1. The firewall filter rule generator 162 may provide the firewall filter rules 172 to the communication controller 104 of the network 140 of FIG. 1.

The method 600 thus enables the rule elements 166 to be consolidated based on the count threshold 168, the weights 174, and feedback from the user 101. The firewall filter rules 172 may be generated in response to receiving confirmation from the user 101 that the rule elements 166 are satisfactory.

In a particular aspect, the firewall filter rule generator 162 may provide the rule elements 166 to a display of the device 160 with an option to manually update one or more of the rule elements 166. For example, the firewall filter rule generator 162 may update the rule elements 166 based on user input and may generate the firewall filter rules 172 based on the updated rule elements 166. To illustrate, an initial set of the rule elements 166 may be automatically generated by the firewall filter rule generator 162 based on the packet data 170. The initial set of the rule elements 166 may be fine-tuned based on user input from the user 101. The firewall filter rules 172 may be based on the fine-tuned version of the rule elements 166. Generating the firewall filter rules 172 based on the fine-tuned version of the rule elements 166 may be more efficient (e.g., less time-consuming) than firewall filter rules that are generated entirely by the user 101.

Figure 7:
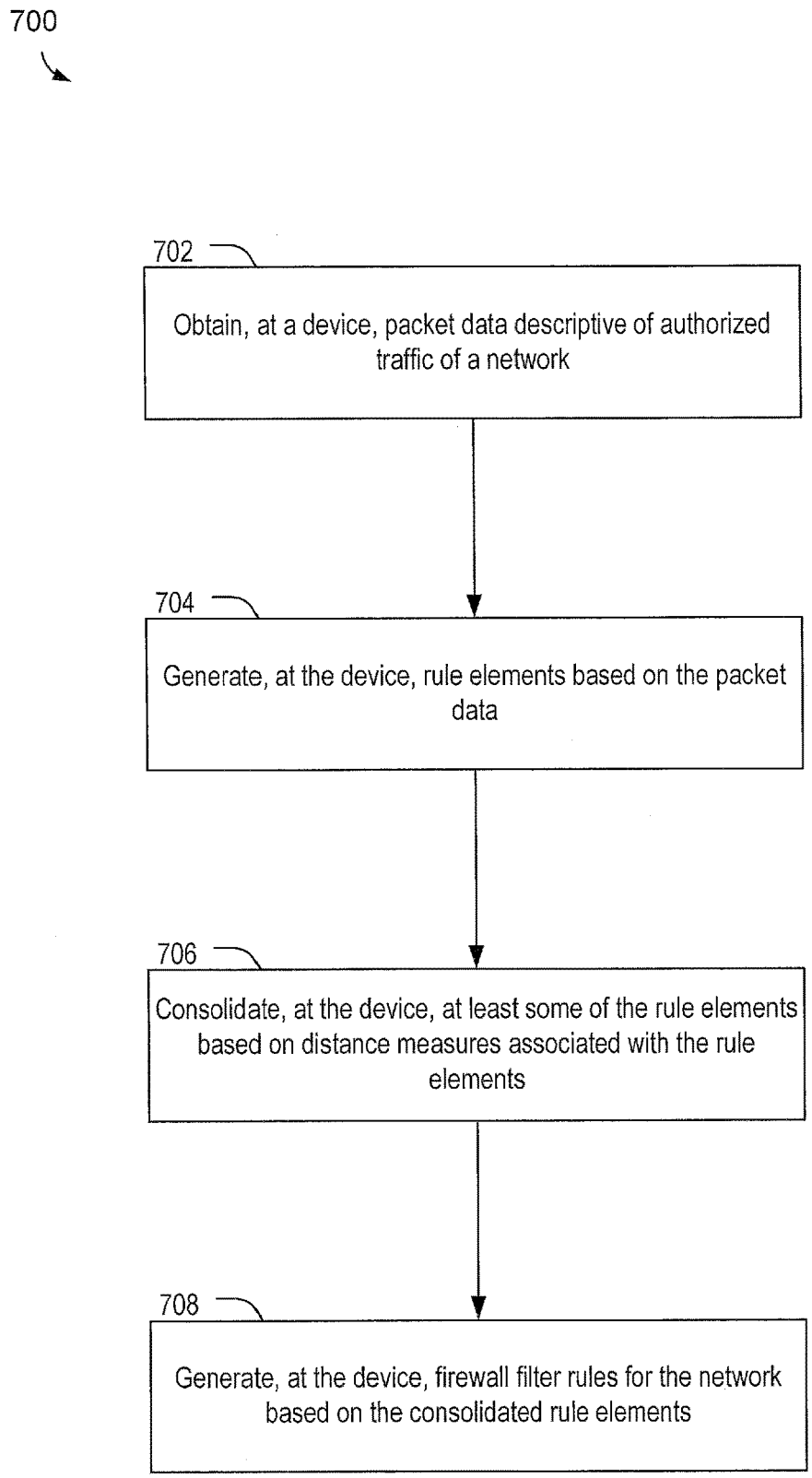
FIG. 7 is a flow chart of another example of a method of generating firewall filter rules.

Referring to FIG. 7, a method of operation is shown and generally designated 700. The method 700 may be performed by the firewall filter rule generator 162, the device 160, the aircraft 102, the system 100 of FIG. 1, or a combination thereof.

The method 700 includes obtaining, at a device, packet data descriptive of authorized traffic of a network, at 702. For example, the firewall filter rule generator 162 may obtain the packet data 170 descriptive of authorized traffic of the network 140, as described with reference to FIG. 1.

The method 700 also includes generating, at the device, rule elements based on the packet data, at 704. For example, the firewall filter rule generator 162 may generate the rule elements 166 based on the packet data 170, as described with reference to FIG. 1.

The method 700 further includes consolidating, at the device, at least some of the rule elements based on distance measures associated with the rule elements, at 706. For example, the firewall filter rule generator 162 of FIG. 1 may reduce a count of the rule elements 166 to satisfy the count threshold 168 by consolidating at least some of the rule elements 166, as described with reference to FIGS. 1-2. In a particular example, the rule elements 166 may be consolidated based on the distance measures 176 associated with the rule elements 166, in accordance with one or more of Equations 1-8.

The method 700 also includes generating, at the device, firewall filter rules for the network based on the consolidated rule elements, at 708. For example, the firewall filter rule generator 162 of FIG. 1 may generate the firewall filter rules 172 based on the consolidated rule elements 166, as described with reference to FIGS. 1-2.

The method 700 thus enables automatic generation of the firewall filter rules 172 based on the packet data 170. The packet data 170 may be descriptive of authorized traffic of the network 140.

Referring to FIG. 8, a method of operation is shown and generally designated 800. The method 800 may be performed by the communication controller 104, the aircraft 102, the system 100 of FIG. 1, or a combination thereof.

The method 800 includes detecting, at a communication controller, a first operation mode of an aircraft, at 802, and in response to detecting the first operation mode, selecting a first set of firewall filter rules at the communication controller to apply to a network of the aircraft, at 804. For example, the communication controller 104 may select the first set of firewall filter rules 572 in response to detecting that the aircraft 102 is parked at the gate 502.

The method 800 also includes detecting, at the communication controller, a second operation mode of the aircraft that differs from the first operation mode, at 806, and in response to detecting the second operation mode, selecting a second set of firewall filter rules at the communication controller to apply to the network, at 808. For example, the communication controller 104 may select the second set of firewall filter rules 576 in response to detecting that the aircraft 102 is at cruising altitude. The method 800 thus enables dynamically selecting amongst different sets of firewall filter rules based on a detected context.

Figure 9:
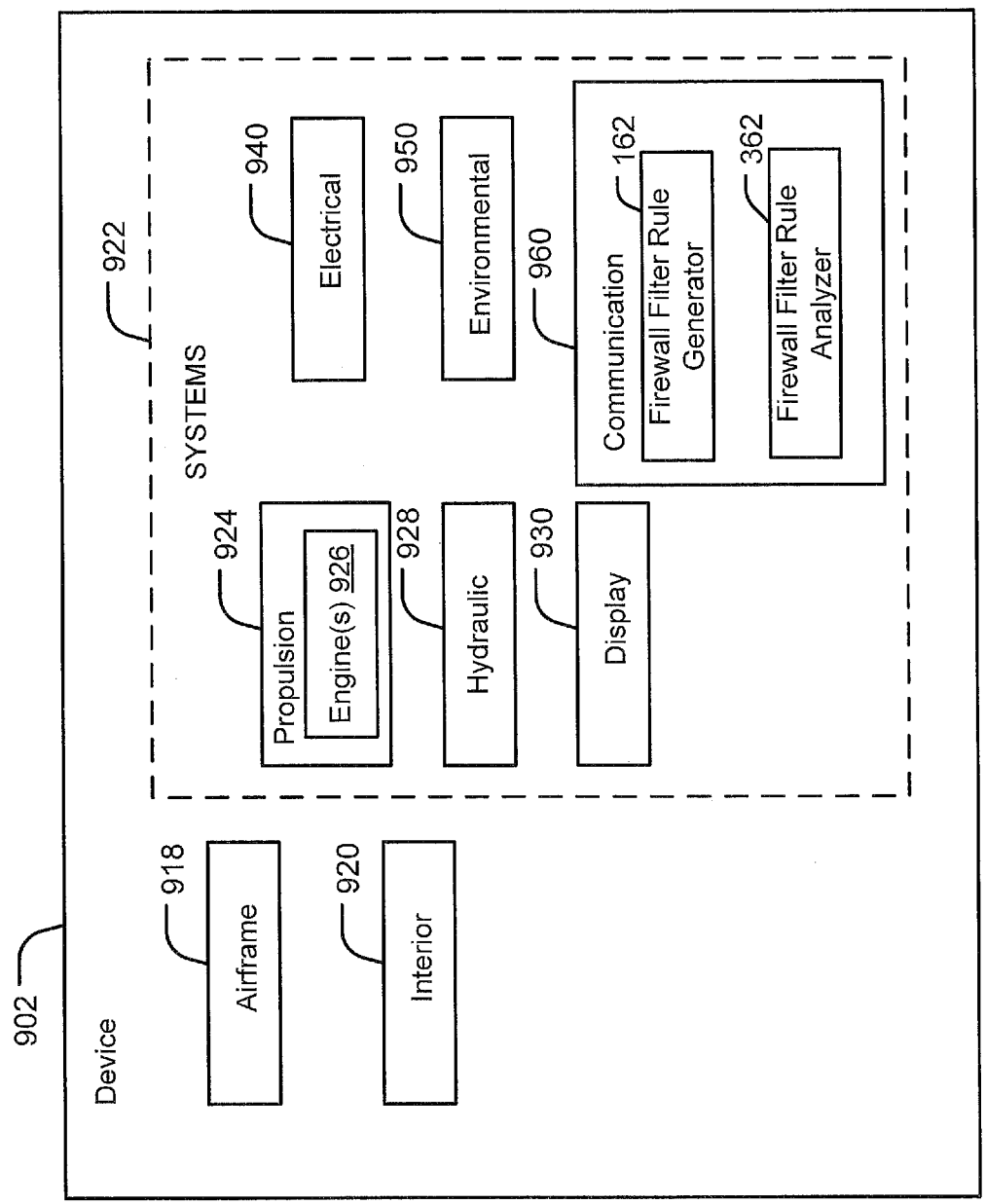
FIG. 9 is a block diagram of an illustrative implementation of a device that includes a firewall filter rule generator, a firewall filter rule analyzer, or both.

Referring to FIG. 9, a block diagram of an illustrative embodiment of a device 902 that includes the firewall filter rule generator 162, the firewall filter rule analyzer 362, or both. The device 902 may correspond to the aircraft 102, the device 160, the communication controller 104 of FIG. 1, or a combination thereof. As shown in FIG. 9, the device 902 may include an airframe 918, an interior 920, and a plurality of systems 922. The systems 922 may include, as illustrative examples, a propulsion system 924 including one or more engines 926, a hydraulic system 928, an electrical system 940, an environmental system 950, a display 930, and a communication system 960. The communication system 960 may include the firewall filter rule generator 162, the firewall filter rule analyzer 362, or both. Any number of other systems may be included, such as a processor coupled to a computer-readable storage device (not shown). The processor may be configured to execute computer-executable instructions (e.g., a program of one or more instructions) stored in the computer-readable storage device (e.g., memory). The instructions when executed, by the processor, may cause the processor to perform one or more operations described with reference to FIGS. 1-8.

Although FIG. 9 specifically illustrates an aerospace application of the firewall filter rule generator 162, the firewall filter rule analyzer 362, or both, in other implementations, the firewall filter rule generator 162, the firewall filter rule analyzer 362, or both, may be used in another application, such as, as a component of a land-based vehicle (e.g., an automobile or train), as a component of a water-based vehicle (e.g., a ship or submarine), as a component of a space craft, as a component of a structure (e.g., an office, a building, an oil platform, etc.), or as a component of a construction equipment or lifting equipment device (e.g., a crane, a lift truck, etc.).

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
   obtaining, at a device, packet data descriptive of authorized traffic of a network;
   generating, at the device, rule elements based on the packet data;
   determining, at the device, a first distance measure based on a comparison of a first rule element of the rule elements and a second rule element of the rule elements, wherein the first distance measure corresponds to a numerical distance between at least one of internet protocol addresses or media access control addresses;
   generating a consolidated rule element by combining the first rule element and the second rule element based on the comparison; and
   generating, at the device, firewall filter rules for the network based on the consolidated rule element.

2. The method of claim 1, wherein the authorized traffic of the network includes a packet, wherein the packet data indicates at least one of a source address indicated by a packet header of the packet, a source port indicated by the packet header, a destination address indicated by the packet header, a destination port indicated by the packet header, or a network protocol indicated by the packet header, and wherein the first rule element of the rule elements indicates at least one of the source address, the source port, the destination address, the destination port, the network protocol, or a direction of the packet.

3. The method of claim 1, wherein the consolidated rule element includes a rule element indicating a source address range and a destination address range, and wherein the firewall filter rules include a first firewall filter rule indicating that packet headers having a source address in the source address range and a destination address in the destination address range are authorized.

4. The method of claim 1, further comprising:
   transmitting, from the device, the firewall filter rules to a controller; and
   routing, at the controller, packets within the network based on the firewall filter rules.

5. The method of claim 1, further comprising determining that the first distance measure is zero in response to determining that a first address range of the first rule element overlaps a second address range of the second rule element.

6. The method of claim 1, further comprising determining the first distance measure based on a weighted sum of a first difference between a first address range of the first rule element and a second address range of the second rule element and a second difference between a first particular address range of the first rule element and a second particular address range of the second rule element.

7. The method of claim 1, further comprising determining the first distance measure based on a weighted sum of a first difference between a first address range of the first rule element and a second address range of the second rule element and a second difference between a first port range of the first rule element and a second port range of the second rule element.

8. The method of claim 1, wherein the packet data is based on an emulation of the network.

9. The method of claim 1, further comprising:
obtaining second packet data corresponding to a second context; and
generating second firewall filter rules based on the second packet data, the second firewall filter rules applicable to the network in the second context,
wherein the packet data corresponds to a first context, and
wherein the firewall filter rules are applicable to the network in the first context.

10. The method of claim 9, wherein the first context corresponds to a taxi mode of an aircraft, and wherein the second context corresponds to a cruise mode of the aircraft.

11. A device comprising:
a memory configured to store packet data descriptive of authorized traffic of a network; and
a processor configured to:
generate rule elements based on the packet data;
determine a first distance measure based on a comparison of a first rule element of the rule elements and a second rule element of the rule elements, wherein the first distance measure corresponds to a numerical distance between at least one of internet protocol addresses or media access control addresses;
generate a consolidated rule element by combining the first rule element and the second rule element based on the comparison; and
generate firewall filter rules for the network based on the consolidated rule element.

12. The device of claim 11, wherein the processor is further configured to:
transmit, from the device, the firewall filter rules to a controller of an aircraft; and
route, at the controller, packets within the network based on the firewall filter rules.

13. The device of claim 11, wherein the processor is further configured to generate the consolidated rule element to indicate at least one of a first address range, a second address range, or one or more addresses between the first address range and the second address range in response to determining that the first rule element indicates the first address range and that the second rule element indicates the second address range.

14. The device of claim 11, wherein the processor is further configured to generate the consolidated rule element to indicate that bidirectional traffic is authorized in response to determining that the first rule element indicates a first direction that is distinct from a second direction indicated by the second rule element.

15. The device of claim 11, wherein the processor is further configured to generate the consolidated rule element to indicate that any port is authorized in response to determining that the first rule element indicates a first port that is distinct from a second port indicated by the second rule element.

16. The device of claim 11, wherein the processor is configured to:
generate the consolidated rule element to indicate that a first port and a second port are authorized in response to determining that the first rule element indicates the first port and that the second rule element indicates the second port; and
generate the consolidated rule element to indicate that any protocol is authorized in response to determining that the first rule element indicates a first protocol that is distinct from a second protocol indicated by the second rule element.

17. A non-transitory computer-readable storage device storing instructions that, when executed by a processor, cause the processor to perform operations comprising:
detecting a first operation mode of an aircraft;
in response to detecting the first operation mode, selecting a first set of firewall filter rules to apply to a network of the aircraft, the first set of firewall filter rules including a first rule that includes a consolidated rule element, the consolidated rule element generated by combining a first rule element and a second rule element based on a distance measure, wherein the distance measure corresponds to a numerical distance between at least one of internet protocol addresses or media access control addresses;
detecting a second operation mode of the aircraft that differs from the first operation mode; and
in response to detecting the second operation mode, selecting a second set of firewall filter rules to apply to the network.

18. The non-transitory computer-readable storage device of claim 17, wherein the first operation mode and the second operation mode each include one of a parked mode, a push back mode, a taxi mode, a take-off mode, a climb mode, a cruise mode, a descent mode, a final approach mode, or a landing mode of the aircraft.

19. The non-transitory computer-readable storage device of claim 17, wherein the first set of firewall filter rules is generated based on first packet data that is descriptive of authorized traffic of the network during the first operation mode of the aircraft, and wherein the second set of firewall filter rules is generated based on second packet data that is descriptive of authorized traffic of the network during the second operation mode of the aircraft.

20. The non-transitory computer-readable storage device of claim 19, wherein at least one of the first set of firewall filter rules or the second set of firewall filter rules is generated based on an emulation of the network.

* * * * *